Figure 1:
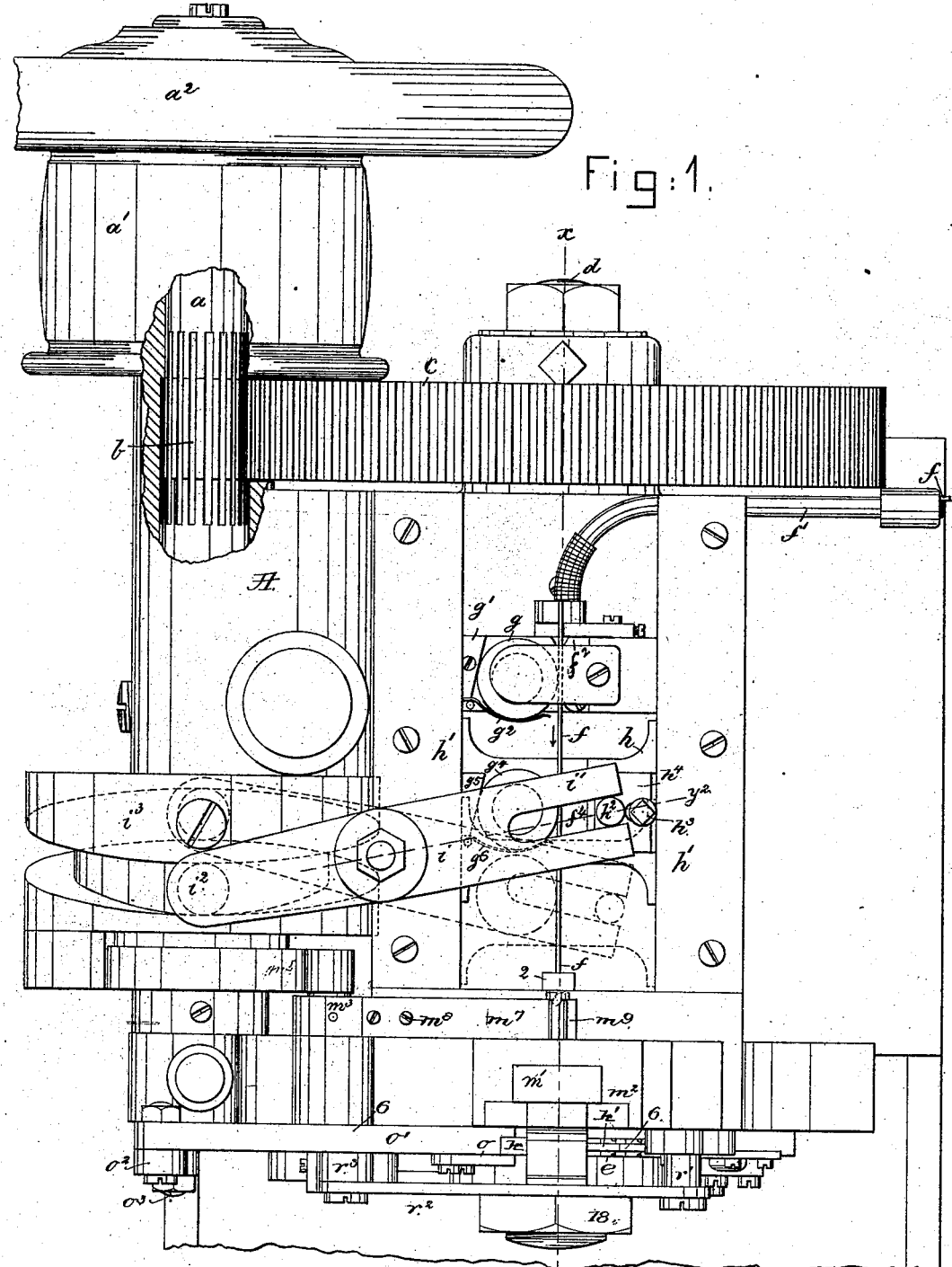

(No Model.)   5 Sheets—Sheet 1.

S. E. MOWER.
MACHINE FOR MAKING STAPLES.

No. 290,994.   Patented Dec. 25, 1883.

Witnesses.
Fred A. Powell,
John F. C. Preinkert

Inventor.
Samuel E. Mower
by Crosby Gregory
Attys.

(No Model.) 5 Sheets—Sheet 3.
S. E. MOWER.
MACHINE FOR MAKING STAPLES.

No. 290,994. Patented Dec. 25, 1883.

Witnesses.
Fred A. Powell.
John F. C. Brinkert.

Inventor.
Samuel E. Mower
by Crosby Gregory
Attys.

(No Model.) 5 Sheets—Sheet 4.
S. E. MOWER.
MACHINE FOR MAKING STAPLES.
No. 290,994. Patented Dec. 25, 1883.
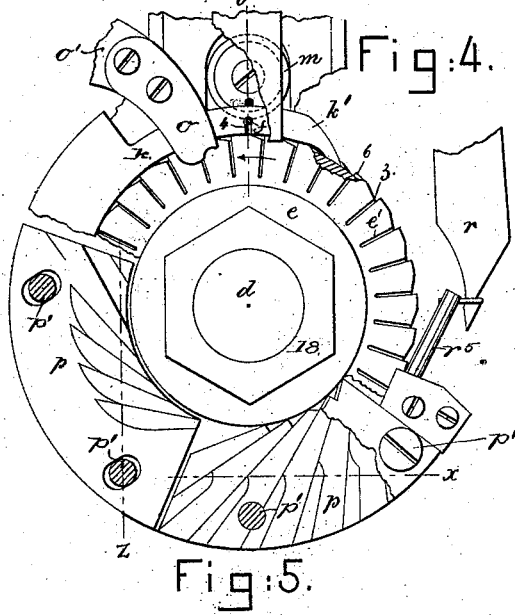
Fig. 4.
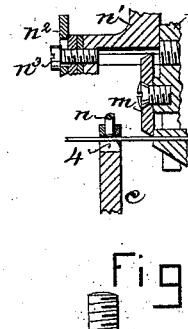
Fig. 6.
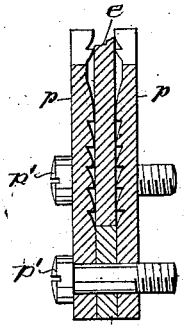
Fig. 7.
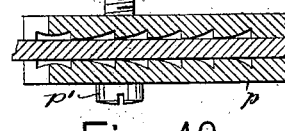
Fig. 8.
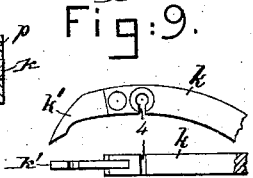
Fig. 9.
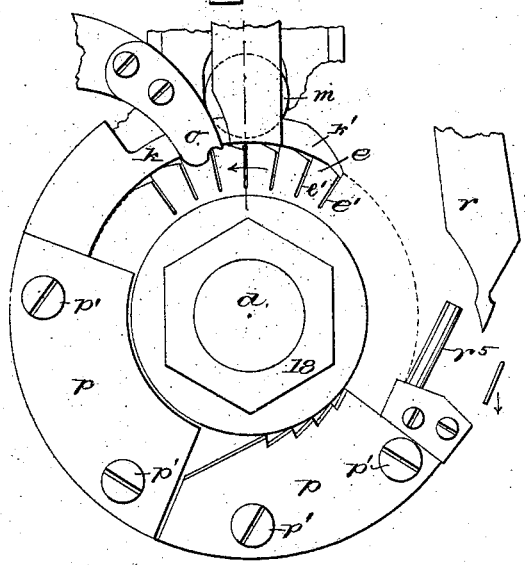
Fig. 5.
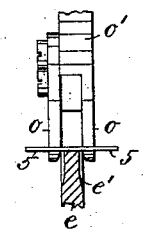
Fig. 10.
Fig. 11.
Fig. 12.
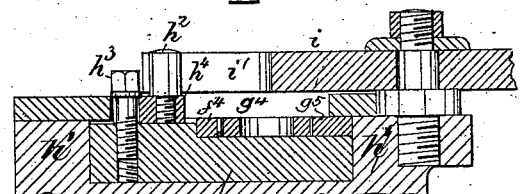
Fig. 13.
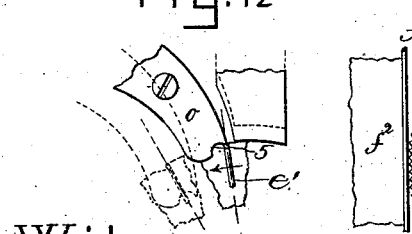
Fig. 14.
Fig. 15.
Witnesses.
Fred A. Powell.
John F. C. Prenkert.
Inventor.
Samuel E. Mower
by Crosby Gregory
Attys.

(No Model.)  5 Sheets—Sheet 5.

S. E. MOWER.
MACHINE FOR MAKING STAPLES.

No. 290,994.  Patented Dec. 25, 1883.

Witnesses
Fred A. Powell
John F. C. Preinkert

Inventor.
Samuel E. Mower
by Crosby Gregory
Attys.

UNITED STATES PATENT OFFICE.

SAMUEL E. MOWER, OF MILFORD, ASSIGNOR TO HENRY G. THOMPSON, OF NEW HAVEN, CONNECTICUT.

MACHINE FOR MAKING STAPLES.

SPECIFICATION forming part of Letters Patent No. 290,994, dated December 25, 1883.

Application filed December 4, 1882. (No model.)

*To all whom it may concern:*

Be it known that I, SAMUEL E. MOWER, of Milford, county of New Haven, State of Connecticut, have invented an Improvement in Machines for Making Staples, of which the following description, in connection with the accompanying drawings, is a specification, like letters on the drawings representing like parts.

My invention relates to a machine for manufacturing staples, it being intended to produce staples such as mentioned in Letters Patent No. 245,088, granted August 2, 1881, in which staples are shown having their legs of uniform thickness or width in a direction measured at right angles to the plane passing through both legs.

The present invention is embodied in a machine having a wire-feeding device operating to feed the wire forward a sufficient distance for the length of an entire staple, the said wire being fed into a suitable carrying device or carriage, (herein shown as circular in shape,) and having a series of suitable receiving seats or recesses arranged about its periphery. The staple-carriage has a continuous rotary movement, and after the wire has been fed into one of the seats a severing mechanism operates to cut off a length of the wire thus fed sufficient for one staple, after which the straight wire thus cut off is conveyed by the further movement of the carriage to the bending mechanism, by which its ends are bent substantially at right angles to its middle portion, thus giving the wire the usual U shape. The seats in the carriage are of such shape as to receive the entire staple, they being made as grooves of sufficient depth to permit the wire to be wholly embedded therein, except the portion near the points of the staples, where the said wire projects from the side of the carriage for a portion of its thickness. In the further movement of the carriage the staple, bent into its seat, is carried against cutters, which remove the metal projecting beyond the seat, thus giving the legs the usual chisel-like shape, the said chisel-edges lying in planes at right angles to the plane through the middle of the wire of the entire staple, instead of lying in the said plane, as is the case in staples formed by cutting the wire at an angle to its length in the usual manner. An ejecting apparatus is employed to throw the finished staple out from its seat in the staple-carriage.

Figure 2:
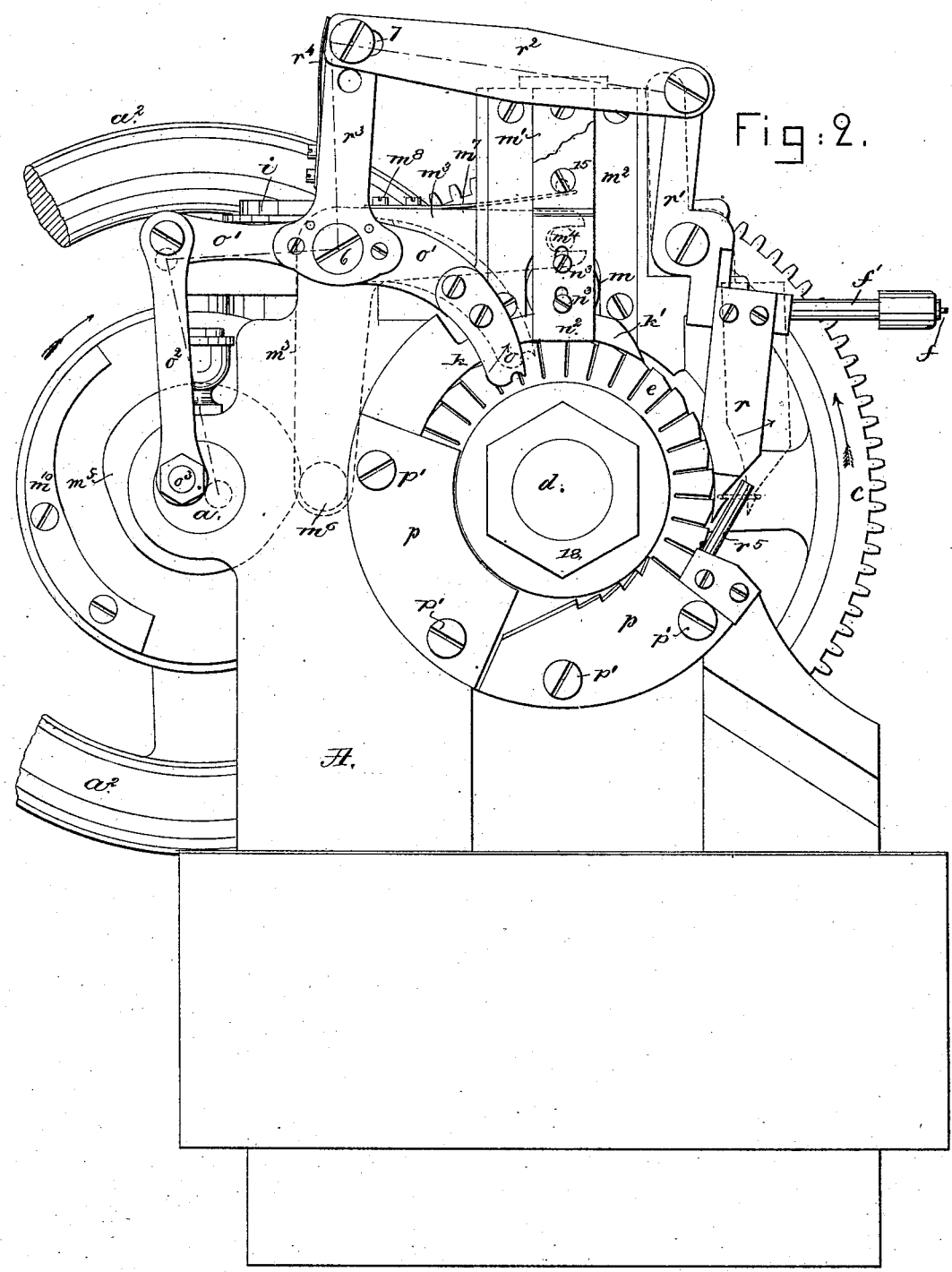
Figure 3:
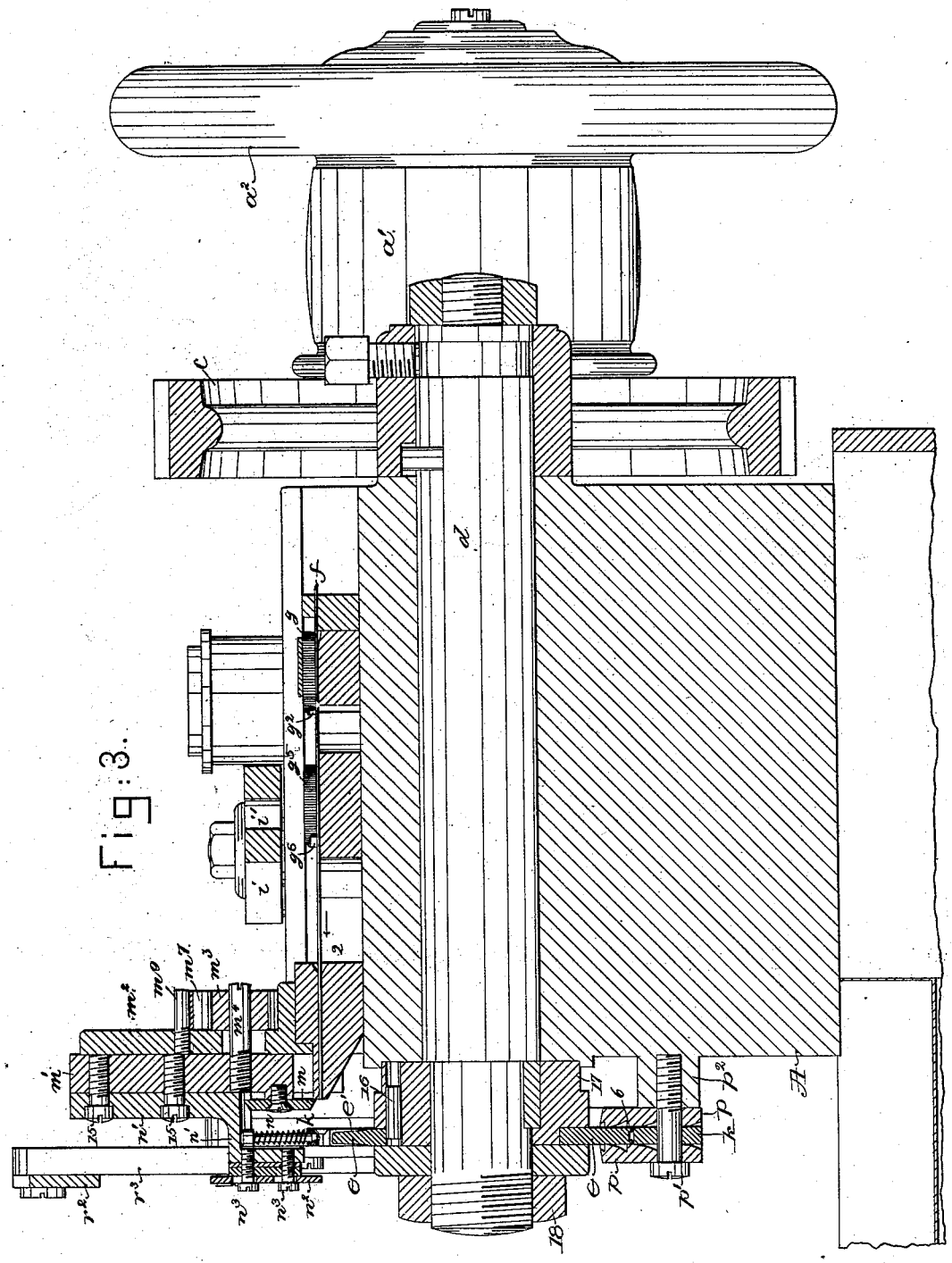

Figure 1 is a plan view of a machine for making staples embodying this invention; Fig. 2, an end elevation thereof; Fig. 3, a longitudinal vertical section on line $x$, Fig. 1; Fig. 4, a detail showing the staple-carriage and the cutters which act on the legs of the staples, a portion of the said carriage being broken away; Fig. 5, a similar detail of the staple-carriage and co-operating parts, Figs. 2, 4, and 5 showing different successive positions of the staple-ejecting device; Fig. 6, a detail on line $y$, Fig. 4, of the cutting-off mechanism; Figs. 7 and 8, vertical and horizontal sections on line $x\ x$ and $z$ of Fig. 4, respectively, showing the staple-carriage and cutters; Fig. 9, a side elevation and under side view of the device through which the wire is transferred to the staple-carriage; Figs. 10, 11, and 12, details of the bending mechanism; Fig. 13, sectional detail of the wire-feeding mechanism, on the line $y^2$, Fig. 1; Fig. 14, a detail of one of the wire-feeding clutches enlarged; Fig. 15, face and end elevations of the finished staple, and Figs. 16 and 17 a face view and vertical section of a modification, in which the metal is removed from the inside, instead of from the outside of the legs of the staple, in sharpening them.

The frame-work A, of suitable shape to hold the working parts, supports the shaft $a$, which is provided with a driving-pulley, $a'$, and fly-wheel $a^2$, and also carries the cams which operate the feeding, cutting, bending, and ejecting mechanism, and is also provided with a pinion, it being herein shown longitudinally grooved to form a series of teeth, $b$, (see Fig. 1,) meshing with a gear-wheel, $c$, upon the shaft $d$, which is thus positively driven by the shaft $a$, but at a slower rate of speed, the said shaft carrying the rotating disk-like staple-carriage $e$, which is provided with a series of suitable receiving-seats, $e'$, of a number which is the same as the number of revolutions of the shaft $a$ required to produce a single revolution of the shaft $d$. The wire $f$, of which the staples are to be made, is drawn from a suitable reel through the guide tube or channel $f'$, which is bent, as shown in Fig. 1, to enable the wire $f$ to be fed in line with the shaft $d$ without interfering with the gear-wheel $c$. From the guide-tube $f'$ the wire $f$ is carried between a fixed abutment or shoulder, $f^2$, and a wire-holding clutch or wheel, $g$, having its surface somewhat serrated, as shown in Fig. 14, the said wheel lying between the wire $f$ and the inclined abutment $g'$ in such a manner that any backward movement of the wire wedges the said wheel between it and the said abutment, thus locking the wire and preventing further backward movement, while the said wheel permits the free forward movement of the said wire, as shown by the arrow, Fig. 1. The spring $g^2$ tends to keep the clutch or wheel $g$ in engagement with the wire and its abutment $g'$, so that it operates almost immediately to arrest backward movement of the wire from the said stationary clutch $g$. The wire is drawn forward by the feeding device, consisting of a carriage, $h$, reciprocated in guides $h'$ by means of the lever $i$, having a fork, $i'$, engaging a stud, $h^2$, upon the said carriage $h$, the said lever $i$ being provided at its other end with a stud, $i^2$, entering the groove of the cam-hub $i^3$, carried by the main shaft $a$. The said feeding-carriage is provided with a wire-clutching mechanism, consisting of a shoulder, $f^4$, wheel $g^4$, inclined abutment $g^5$, and spring $g^6$, all engaging the wire in the same manner as the stationary wire-clutching mechanism previously described. The said wheel $g^4$ grips the wire and carries it with it in its forward movement in the direction of the arrow, Fig. 1, but slips freely over the said wire in the backward movement of the said wheel and carriage, at which time the wire is prevented from backward movement by means of the stationary clutch or wheel $g$. The wire $f$ is thus fed forward intermittingly a definite space at each rotation of the shaft $a$, the feeding movement, however, occupying only a portion of the time taken by the said rotation. The stud $h^2$ is fixed upon the carriage $h$, (see Fig. 13,) by means of a set-screw, $h^3$, passing through a slot in the block $h^4$, carrying the said stud, which is thus made adjustable toward and from the fulcrum of the lever $i$, to thus regulate the length of feed. The wire $f$ is carried forward from the feeding mechanism through a passage, 2, near the front end of the machine, (see Fig. 3,) and thence through the transferring device $k$ above the periphery of the staple-carriage $e$, having the series of toothed like recesses 3 around its periphery, to receive the piece of wire that is to form the staple, the length of wire fed forward at each movement of the feeding device being just sufficient for a staple, and being cut off by the severing device shown as a disk-cutter, $m$, mounted on a carriage, $m'$, reciprocated in a vertical guide, $m^2$, by the bent lever $m^3$, one arm of which is forked to engage a pin, $m^4$, (see Fig. 3,) at the rear side of the carriage $m'$, and the other arm of which is provided with a stud, $m^6$, actuated by the cam $m^5$ on the main shaft $a$, the said lever $m^3$ being clearly shown in dotted lines in Fig. 2, together with its actuating-cam $m^5$. The spring $m^7$, attached to lever $m^3$ by screws $m^8$, acting under a stud, $m^9$, on the fixed guide-way $m^2$, retains the roller-stud $m^6$ against the cam $m^5$. The cam-surface $m^{10}$, acting on the roll $m^6$, moves lever $m^3$, to force the cutter down positively. The length of wire thus cut off is then pressed down through the slot 4 (see Fig. 4) in the holder $k$ and into one of the notches 3 of the staple-carriage $e$ by means of the plunger $n$, (see Fig. 3,) which, for such purpose, is depressed by a shoulder on a bracket, $n'$, connected by screws 15 with the carriage $m'$ by which the cutting device is operated. The bracket $n'$ (see Fig. 3) has a stop, $n^2$, connected with it by set-screws $n^3$. This stop prevents the short piece of wire for the staple from shooting through the holder $k$ just as it is cut, and also serves, as it descends with the carriage, to prevent the short piece of wire from being moved longitudinally. As the short piece of wire is cut off it is depressed into one of the notches 3, of the carriage in front of and so as to be engaged by the radial shoulder at the rear side of the said notch, and in the continuous rotary movement of the carriage $e$ in the direction of the arrow (see Fig. 4) is conveyed along beneath the holder $k$ between which and the periphery of the said carriage $e$ the straight wire is held with its ends projecting at either side of the carriage, as shown at 5, Fig. 10. The straight wire, in the condition shown in Fig. 10, is conveyed by the carriage $e$ into the position shown in Fig. 12, beneath the end of the bending device, shown in Figs. 10 and 11 as consisting of two wipers, $o$, connected with one arm of a lever, $o'$, pivoted at 6 upon the frame-work, and having its other arm connected by a link, $o^2$, with a wrist-pin, $o^3$, or eccentric upon the main shaft $a$. The said bending device $o$ is moved by the said devices from the position shown in Fig. 12, at the periphery of the carriage $e$, as shown in Fig. 10, and full lines, Fig. 12, down at the sides of the periphery of the said carriage, as shown in Fig. 11, and dotted lines, Fig. 12, it in its descent accompanying the rotary movement of the carriage, as best indicated in Fig. 12, and thus acting continuously upon each single piece of wire as it is brought beneath it. The staple-carriage $e$ is provided with a series of grooves or seats, $e'$, into which the ends of the wire which form the legs of the staple are sunk by the bending device $o$, the said grooves $e'$, as shown in Fig. 10, being of sufficient depth near the bridge or connecting portion of the staple to receive the entire wire of the leg, but being made shallower near the ends of the legs, to cause the metal to project beyond the face of the carriage, as shown in Fig. 11. Each groove or seat $e'$ of the carriage $e$ is thus provided with a ∪-shaped wire bent into it, portions of the legs thereof near their ends projecting beyond the faces of the said carriage, so that in the continuous rotation thereof it carries the said wires between or past a series of file-like cutting or milling devices, $p$, composed of segmental steel-plates adjustably attached by set-screws $p'$ inserted into holes in an annular or curved web, $p^2$, the said cutting or milling devices being duplicated at each side of the carriage, and having a series of teeth, the shape of which is best shown in Figs. 4, 7, and 8. The teeth of these cutting or milling devices act upon the portions of the metal staple which project, as described, beyond the faces of the carriage and remove such projecting portions even with the face of the carriage $e$, thus sharpening the legs to form chisel-points, as shown in Fig. 15, the edges of which lie in planes at right angles to the plane through the middle of the wire of the entire staple, but retaining them of substantially the same width throughout their length, as shown by the edge view, Fig. 15. The periphery of the carriage $e$, between the notches 3, has an annular groove, as shown at 6, Figs. 1, 3, and 4, into which the point of the ejecting device $r$ enters to engage the bridge or connecting portion of the staple as it emerges from between the cutters $p$. The ejecting device $r$ is mounted on a lever, $r'$, connected by a link, $r^2$, with an arm, $r^3$, mounted on the lever $o'$ of the bending mechanism, the said ejecting device $r$ thus being vibrated once at each rotation of the shaft $a$, or as each staple is brought opposite to it in the movement of the carriage $e$. The ejecting device $r$, in its vibrations, engages and withdraws the finished staple from its seat in the carriage $e$, its operation being shown in progressive steps in Figs. 2, 4, and 5. The lower end of the ejecting device moves outward between two pins, $r^5$, which are at such distance apart as to act upon the legs of the staple as it is being drawn from the carriage, and produce sufficient friction thereon to retain the staple in position upon the ejecting device, as shown in Fig. 4, until wholly clear of the pins, when the staple drops from the ejector. The holder $k$, (see Fig. 9,) from which the wire when first cut off is conveyed into the carriage, is provided with a stationary finger, $k'$, to enter the groove 6 in the periphery of the carriage, and remove from the carriage any staple which may have escaped the ejecting device $r$, to thus prevent the machine becoming clogged by two wires occupying the same seat. The point at which the link $r^2$ of the ejecting device is connected with the arm $r^3$ is slotted, as shown at 7, the said link being acted upon by a spring, $r^4$, to press the end of the ejecting device $r$ into the groove 6 in the periphery of the carriage $e$, to thus insure that the point of the ejector shall always be in proper position to engage the staple, even though the parts become worn, a result which might not be so readily attained if the connections were positive throughout.

Figure 16:
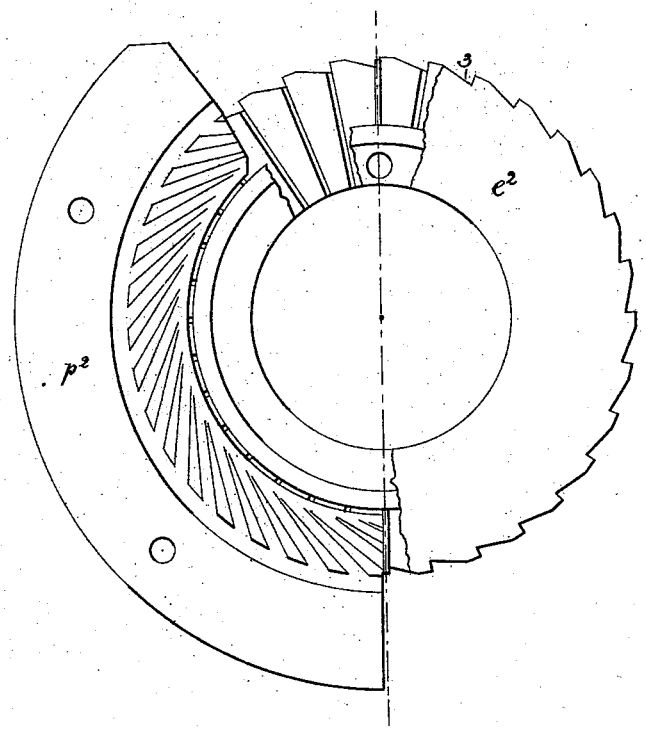
Figure 17:
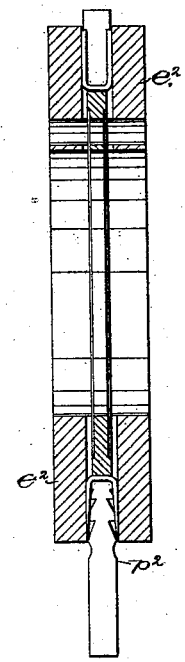

In the modifications shown in Figs. 16 and 17 the wire is bent down between the two portions of a carriage, $e^2$, composed of two disks, the metal at the inside of the legs of the wire projecting beyond the faces of the disk $e^x$, and being acted upon by a cutter, $p^2$, lying between the said disks, such modification being the converse of that before described, leaving the staples chisel-pointed, as before, but leaving the leg of the staple cylindrical at the outside and plane at the inside, instead of the reverse.

I do not desire to limit my invention to the exact construction of the parts herein shown, as it is obvious that the same may be varied in detail without interfering with my invention as expressed in combinations of mechanism, as will be hereinafter set forth.

The carriage $e$ is secured to the shaft $d$ by a pin, 16, (see Fig. 3,) carried by the hub 17 fast thereon, the carriage being also held by the nut 18.

I claim—

1. In a staple-forming machine, wire feeding and severing mechanism, substantially as described, a holder for the short severed wire, a traveling carriage, and a plunger to transfer the short severed wire from its holder to a seat in the traveling carriage, where it is bent to shape and sharpened, as set forth.

2. The wire feeding and severing mechanism and traveling carriage provided with seats for the short pieces of wire, combined with an independent bending device and means to move it toward the carriage, to bend the wire into staple form about the said carriage, substantially as described.

3. In a machine for making staples, a holder for the short severed wire of which the staple is to be made, and a traveling carriage provided with seats to receive the legs of the wire when it is bent into a staple, combined with a plunger to transfer the unbent short wire to the said traveling carriage, substantially as described.

4. The traveling carriage provided with seats for the short pieces of wire, combined with the bending device to act upon and bend the short pieces of wire over the said carriage, substantially as described.

5. The traveling carriage having the seats for the short pieces of wire and side grooves to receive the parts of the wire to form the legs of the staple, combined with the bending device, and means to operate the latter, whereby the end of the bending device bends the wire into staple form over the carriage and into the grooves of the same, and also travels forward with the carriage for a short distance, substantially as described.

6. The main cam-shaft, and carriage-shaft, and carriage with a series of staple-receiving seats, the said shafts being geared together, as described, for moving the carriage the distance between two seats at each rotation of the cam-shaft, combined with wire feeding and severing mechanism intermittingly operated at each rotation of the main cam-shaft, substantially as set forth.

7. The main cam-shaft and carriage-shaft, geared together as described, and the carriage provided with staple-seats, and the cutting or milling device, combined with wire feeding, severing, and bending mechanism, and a staple-ejecting device, all intermittingly operated by the said main cam-shaft substantially as set forth.

8. The traveling carriage provided with seats and grooves to hold the wire bent into staple form, combined with the cutting or milling devices to remove a portion of the metal from the legs of the staple to point the same, substantially as described.

9. The traveling carriage provided with seats and grooves and the bending device to bend the short pieces of wire into staple shape and place them in the grooves of the said carriage, combined with the cutting or milling devices to remove a portion of the metal from the legs of the staples to point the same, substantially as described.

10. The traveling carriage and bending device to bend the short pieces of wire into staple form, combined with the ejector having a vibrating movement to take the staples from the carriage, substantially as described.

11. The traveling carriage to carry the staples and cutting or milling devices to remove a part of the metal from the legs of the staples, combined with the ejector to remove the staple from the carriage, substantially as described.

12. The carriage grooved at 6 and the ejector adapted to enter the said groove and engage the cross-bar of the staple, combined with surfaces or pins $r^3$, to retain the staple on the ejector until withdrawn from the carriage, substantially as described.

13. The carriage $e$, grooved at 6, and provided with seats for the staples, combined with the ejector, and with the point $k'$ of the stationary finger to remove a staple skipped by the ejector, substantially as described.

14. The slide $m'$, cutter $m$, mounted thereon, block 2, through which the wire is fed, and bracket and its stop $n^2$, combined with the holder $k$, and carriage $e$, and plunger to transfer short pieces of wire into the seats of the carriage, substantially as described.

15. The shaft $a$, link $o^2$, and pivoted lever $o'$, and bending device, combined with the carriage $e$, having the seats, and notches, and shoulders, substantially as shown and described.

In testimony whereof I have signed my name to this specification in the presence of two subscribing witnesses.

SAMUEL E. MOWER.

Witnesses:
H. GRANT THOMPSON,
ARTHUR G. THOMPSON.